United States Patent
Cooley et al.

(10) Patent No.: US 7,809,795 B1
(45) Date of Patent: Oct. 5, 2010

(54) LINGUISTIC NONSENSE DETECTION FOR UNDESIRABLE MESSAGE CLASSIFICATION

(75) Inventors: Shaun Cooley, El Segundo, CA (US); Brian Powell, El Segundo, CA (US)

(73) Assignee: Symantec Corporation, Mountain View, CA (US)

( * ) Notice: Subject to any disclaimer, the term of this patent is extended or adjusted under 35 U.S.C. 154(b) by 493 days.

(21) Appl. No.: 11/535,437

(22) Filed: Sep. 26, 2006

(51) Int. Cl.
*G06F 15/16* (2006.01)

(52) U.S. Cl. .................................. 709/206; 709/200

(58) Field of Classification Search .................. 709/206
See application file for complete search history.

(56) References Cited

U.S. PATENT DOCUMENTS

| | | | | |
|---|---|---|---|---|
| 6,073,165 | A * | 6/2000 | Narasimhan et al. | 709/206 |
| 6,421,709 | B1 * | 7/2002 | McCormick et al. | 709/206 |
| 7,299,261 | B1 * | 11/2007 | Oliver et al. | 709/206 |
| 2002/0103914 | A1 * | 8/2002 | Dutta et al. | 709/229 |
| 2003/0158725 | A1 * | 8/2003 | Woods | 704/10 |
| 2004/0087300 | A1 * | 5/2004 | Lewis | 455/412.2 |
| 2004/0107386 | A1 * | 6/2004 | Burdick et al. | 714/38 |
| 2005/0015454 | A1 * | 1/2005 | Goodman et al. | 709/207 |
| 2005/0060643 | A1 * | 3/2005 | Glass et al. | 715/501.1 |
| 2005/0080860 | A1 * | 4/2005 | Daniell et al. | 709/206 |
| 2005/0091321 | A1 * | 4/2005 | Daniell et al. | 709/206 |
| 2005/0097174 | A1 * | 5/2005 | Daniell | 709/206 |
| 2005/0193073 | A1 * | 9/2005 | Mehr et al. | 709/206 |
| 2005/0262210 | A1 * | 11/2005 | Yu | 709/206 |
| 2008/0133682 | A1 * | 6/2008 | Chadwick et al. | 709/206 |

* cited by examiner

*Primary Examiner*—John Follansbee
*Assistant Examiner*—Anthony Mejia
(74) *Attorney, Agent, or Firm*—Brill Law Office; Jeffrey Brill

(57) ABSTRACT

Nonsense words are removed from incoming emails and visually similar (look-alike) characters are replaced with the actual, corresponding characters, so that the emails can be more accurately analyzed to see if they are spam. More specifically, an incoming email stream is filtered, and the emails are normalized to enable more accurate spam detection. In some embodiments, the normalization comprises the removal of nonsense words and/or the replacement of look-alike characters according to a set of rules. In other embodiments, more and/or different normalization techniques are utilized. In some embodiments, the language in which an email is written is identified in order to aid in the normalization. Once incoming emails are normalized, they are then analyzed to detect spam or other forms of undesirable email, such as phishing emails.

18 Claims, 1 Drawing Sheet

LINGUISTIC NONSENSE DETECTION FOR UNDESIRABLE MESSAGE CLASSIFICATION

TECHNICAL FIELD

This invention pertains generally to computer security and more specifically to identifying undesirable electronic messages.

BACKGROUND

Current statistical spam detection techniques rely heavily on their ability to find known words during classification of electronic messages. The authors of spam emails have become aware of this, and have started to include nonsense words in their messages. The use of nonsense words to spoof spam detection takes two primary forms. The first is the insertion of a small number (e.g., one or two) of nonsense words into emails. This is used to thwart simple hash detection of duplicate copies of a single message being sent to many users at one internet service provider. By inserting different nonsense words into each copy of the message, the hash detection does not determine that the messages are duplicates. This form of nonsense word insertion is referred to as a "hash buster." The second form consists of inserting a large number of nonsense words into emails, where the words as a group cause misclassification of the overall message.

Statistical spam detection relies heavily not only on the ability to find known words, but to classify them as well. For example, specific words, combinations of words and frequency of occurrence of words tend to be associated with spam emails. Anti-spam engines can be tricked into misclassifying spam messages as legitimate when the author replaces characters in these "spammy" words with other characters that have a similar visual appearance. For example, the characters 'â Ô ç β G Ø  'Y Z Θ X KII' look like 'a O C B G O Y Z O X K W' respectively. Since the substituted characters are similar in visual appearance, a human reader can still discern the content of the message.

What is needed are methods, computer readable media and computer systems for allowing detection of undesirable emails, even where nonsense words and visually similar characters have been inserted.

SUMMARY OF INVENTION

Nonsense words are removed from incoming emails and visually similar (look-alike) characters are replaced with the actual, corresponding characters, so that the emails can be more accurately analyzed to see if they are spam. More specifically, an incoming email stream is filtered, and the emails are normalized to enable more accurate spam detection. In some embodiments, the normalization comprises the removal of nonsense words and/or the replacement of look-alike characters according to a set of rules. In other embodiments, more and/or different normalization techniques are utilized. In some embodiments, the language in which an email is written is identified in order to aid in the normalization. Once incoming emails are normalized, they are then analyzed to detect spam or other forms of undesirable email, such as phishing emails.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

Figure 1:
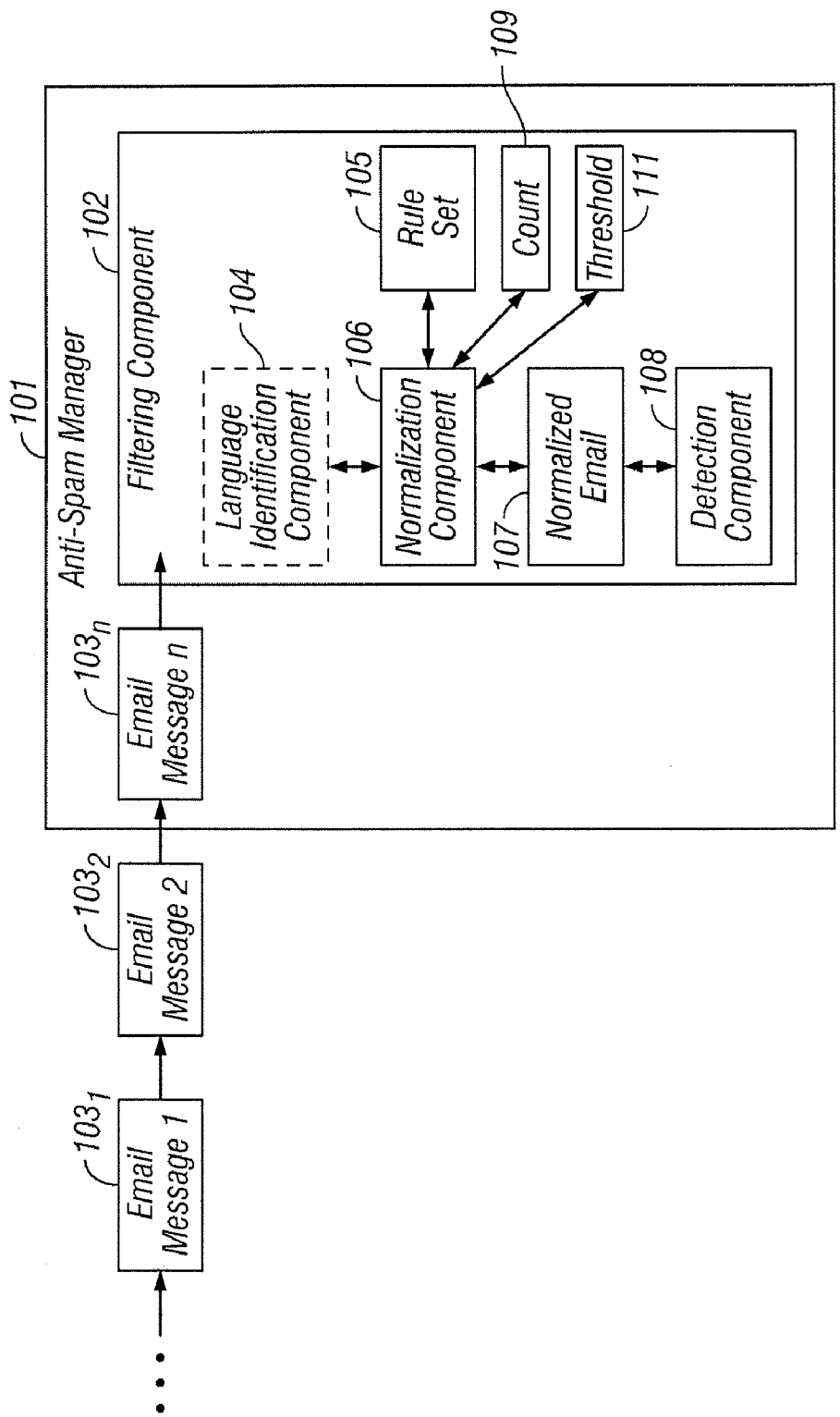
FIG. 1 is a block diagram illustrating the operation of an anti-spam manager, according to some embodiments of the present invention.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

FIG. 1 illustrates an anti-spam manager 101, according to some embodiments of the present invention. It is to be understood that although the anti-spam manager 101 is illustrated as a single entity, as the term is used herein an anti-spam manager 101 refers to a collection of functionalities which can be implemented as software, hardware, firmware or any combination of these. Where an anti-spam manager 101 is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As illustrated in FIG. 1, a filtering component 102 of the anti-spam manager 101 filters incoming email messages 103 so that the emails 103 can be further analyzed. As the term is used herein, filtering incoming email messages 103 simply refers to identifying incoming email messages 103 and processing them in some way before the messages arrive at their target destination. Various mechanisms are known by those of ordinary skill in the art for filtering an email 103 stream, all of which can be used within the context of the present invention. For example, anything from a plug-in to a simple mail transfer protocol server to a proxy server or a gateway can be used for message 103 filtering. So as not to distract from the explanation of the functionality of interest, these specific instantiations of the filtering component 102 are not separately illustrated.

In some embodiments, a language identification component 104 of the anti-spam manager 101 performs language identification of the filtered email messages 103 (i.e., identification of the primary language in which the message 103 is written). Various techniques for language identification are known by those of ordinary skill in the relevant art. Most such techniques involve performing an n-gram based statistical analysis of the content of the message 103. In other words, combinations of symbols of various lengths (n-grams) are identified in the message 103, and a statistical analysis is performed, which takes into account in which language the detected n-grams are most likely to appear. Although identifying the language in which the message 103 is written is helpful to the anti-spam manager 101, where the entire message 103 is encoded using look alike techniques, the language identification can fail. In any case, some embodiments utilize language detection and others do not.

A normalization component 106 of the anti-spam manager 101 normalizes detected messages 103, so as to increase the chances of successfully identifying spam. This typically involves utilizing a set of rules 105 for detecting contents of the message 103 requiring normalization, such as nonsense words to remove or visually similar characters to be replaced.

For example, in an embodiment which identifies nonsense words in email messages 103 written in English, the following rules 105 could be used to distinguish legitimate words from nonsense:

- legitimate words contain no more than three vowels in a row (except in the word 'you')
- legitimate words contain no more than five consonants in a row
- in legitimate words, a given character cannot be repeated more than three times in a row
- legitimate words cannot transition between upper and lowercase more than twice
- legitimate words longer than five characters cannot contain uppercase letters, lowercase letters, numbers and punctuation
- legitimate words longer than six characters cannot contain uppercase letters, lowercase letters and numbers
- ignore numbers longer than four digits without punctuation (this rule allows phone numbers, dollar figures and percentages, since they all have punctuation)
- allow single vowels (such as 'I' and 'a')
- no single consonants (i.e., all legitimate words require at least one vowel)
- require one vowel for every five consonants per legitimate word
- no more than three vowels for every consonant per legitimate word The normalization component 106 can parse email messages 103 for nonsense words according to the rule set 105. Each time a nonsense word is found, it is removed from the message 103. Once all nonsense words have been removed, the normalized message 107 is then analyzed to determine whether it is spam, as described below.

In embodiments in which the anti-spam manager 101 replaces look-alike characters, the rule set 105 determines which characters to replace. Such a rule set 105 generally consists of an array of "from character to character" items. For example, as noted above the characters 'â Ô ç β G Ø 'Y Z Θ X K III' look like the characters 'a O C B G O Y Z O X K W' respectively. Thus, the replacement rules 105 could direct the anti-spam manager 101 to replace instances of the former characters with the corresponding latter. The replacement rule set 105 can also be more complicated, and include (e.g., language specific) rules 105 regarding when to execute certain replacements. For example, a rule 105 could specify that in emails 103 written in English, to only replace '$a_t$' with 'a' if the '$a_t$' character follows a 't.'

It is to be understood that the specific rules 105 discussed above are only examples, and in various embodiments many variations and combinations (both language specific and general) are possible. Of course, in some embodiments, the anti-spam manager 101 performs nonsense word removal or character substitution, whereas in other embodiments it performs both and/or other forms of normalization as desired.

Regardless, normalized messages 107 are subject to spam detection. A detection component 108 of the anti-spam manager 101 uses mechanism(s) such as statistical analysis or a hash based duplicate detection. Because the nonsense words have been removed and/or the primary characters substituted for the look-alike characters, the normalized email 107 can be more accurately evaluated for legitimacy. It is to be understood that various techniques for spam detection are known to those of ordinary skill in the relevant art, and use of any of these alone or in combination is within the scope of the present invention. It is to be further understood that the present invention is not limited to analyzing normalized emails 107 for spam, but can also perform similar analysis to detect other forms of undesirable messages, such as phishing attempts.

In some embodiments, the anti-spam manager 101 keeps a count 109 of removed nonsense words and/or replaced look-alike characters that occur in a given message 103. In some such embodiments, if this count 109 is equal to or greater than a threshold value 111, the message 103 is classified as spam. In other embodiments, the count 109 reaching the threshold value 111 is taken is one piece of evidence against the legitimacy of the message 103. It is to be understood that the threshold value 111 to use is a variable design parameter which can be adjusted up or down as desired.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats. Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Accordingly, the disclosure of the present invention is intended to be illustrative, but not limiting, of the scope of the invention, which is set forth in the following claims.

What is claimed is:

1. A computer implemented method for identifying undesirable electronic messages by a computer, the method comprising the steps of:
   - identifying, by the computer, incoming electronic messages;
   - normalizing, by the computer, identified electronic messages according to a plurality of rules for distinguishing non-legitimate words from legitimate words, said normalizing further comprising identifying non-legitimate words obfuscating electronic messages according to the plurality of rules, and deleting the identified non-legitimate words from the electronic messages;
   - wherein said plurality of rules for distinguishing non-legitimate words from legitimate words comprises at least three rules from a group of rules consisting of:
     - a rule specifying a maximum number of consecutive vowels in a legitimate word; a rule specifying a maximum number of consecutive consonants in a legitimate word; a rule specifying a maximum number of consecutive uses of any single character in a legitimate word; a rule specifying a maximum number of transitions between upper case letters and lower case letters in a legitimate word; a rule specifying a maximum length of a legitimate word containing numbers without punctuation; a rule specifying a maximum length of a legitimate word containing upper case letters, lower case letters and numbers; a rule specifying a maximum length of a legitimate word containing upper case letters, lower case letters, numbers and punctuation; a rule specifying a minimum number of vowels in a legitimate word; a rule specifying a minimum number of consonants in a legitimate word; a rule specifying a minimum ratio of vowels to consonants in a legitimate word; and a rule specifying a maximum ratio of vowels to consonants in a legitimate word; and analyzing, by the computer, normalized electronic message to identify undesirable electronic messages.

2. The method of claim 1 further comprising:

identifying, by the computer, a language in which an identified electronic message is composed, prior to normalizing the identified electronic message according to the set of rules; and normalizing, by the computer, the identified electronic messages according to a set of rules taking into account the identified language.

3. The method of claim 1 wherein normalizing identified electronic messages according to a set of rules further comprises:

identifying, by the computer, look-alike characters in electronic messages; and replacing, by the computer, identified look-alike characters with corresponding primary characters in the electronic messages.

4. The method of claim 1 wherein analyzing normalized electronic message to identify undesirable electronic messages further comprises:

performing, by the computer, a statistical analysis of normalized electronic message content in order to identify statistical patterns associated with undesirable electronic messages.

5. The method of claim 1 wherein analyzing normalized electronic message to identify undesirable electronic messages further comprises:

performing, by the computer, a hash based analysis of normalized electronic message content to detect received duplicate copies of electronic messages.

6. The method of claim 1 wherein analyzing normalized electronic message to identify undesirable electronic messages further comprises:

keeping, by the computer, a count of detected items to be normalized in an electronic message; and using, by the computer, data concerning a relationship between the count of detected items and a dynamic threshold value as evidence in the identification of an electronic message as undesirable.

7. The method of claim 1 further comprising determining, by the computer, that at least one received electronic message comprises a type of undesirable electronic message from a group of undesirable electronic message types consisting of:

a spam email; and a phishing email.

8. At least one non-transitory medium storing a computer program product for identifying undesirable electronic messages, the computer program product comprising:

program code for identifying incoming electronic messages;

program code for normalizing identified electronic messages according to a plurality rules for distinguishing non-legitimate words from legitimate words, said normalizing further comprising identifying non-legitimate words obfuscating electronic messages according to the plurality of rules and deleting the identified non-legitimate words from the electronic messages;

wherein said plurality of rules for distinguishing non-legitimate words from legitimate words comprises at least three rules from a group of rules consisting of:

a rule specifying a maximum number of consecutive vowels in a legitimate word;

a rule specifying a maximum number of consecutive consonants in a legitimate word;

a rule specifying a maximum number of consecutive uses of any single character in a legitimate word;

a rule specifying a maximum number of transitions between upper case letters and lower case letters in a legitimate word;

a rule specifying a maximum length of a legitimate word containing numbers without punctuation; a rule specifying a maximum length of a legitimate word containing upper case letters, lower case letters and numbers;

a rule specifying a maximum length of a legitimate word containing upper case letters, lower case letters, numbers and punctuation;

a rule specifying a minimum number of vowels in a legitimate word;

a rule specifying a minimum number of consonants in a legitimate word;

a rule specifying a minimum ratio of vowels to consonants in a legitimate word;

and a rule specifying a maximum ratio of vowels to consonants in a legitimate word; and program code for analyzing normalized electronic message to identify undesirable electronic messages.

9. The computer program product of claim 8 further comprising:

program code for identifying a language in which an identified electronic message is composed, prior to normalizing the identified electronic message according to the set of rules; and program code for normalizing the identified electronic messages according to a set of rules taking into account the identified language.

10. The computer program product of claim 8 wherein the program code for normalizing identified electronic messages according to a set of rules further comprises:

program code for identifying look-alike characters in electronic messages; and program code for replacing identified look-alike characters with corresponding primary characters in the electronic messages.

11. The computer program product of claim 8 wherein the program code for analyzing normalized electronic message to identify undesirable electronic messages further comprises:

program code for performing a statistical analysis of normalized electronic message content in order to identify statistical patterns associated with undesirable electronic messages.

12. The computer program product of claim 8 wherein the program code for analyzing normalized electronic message to identify undesirable electronic messages further comprises:

program code for performing a hash based analysis of normalized electronic message content to detect received duplicate copies of electronic messages.

13. The computer program product of claim 8 wherein the program code for analyzing normalized electronic message to identify undesirable electronic messages further comprises:

program code for keeping a count of detected items to be normalized in an electronic message; and program code for using data concerning a relationship between the count of detected items and a dynamic threshold value as evidence in the identification of an electronic message as undesirable.

14. The computer program product of claim 8 further comprising program code for determining that at least one received electronic message comprises a type of undesirable electronic message from a group of undesirable electronic message types consisting of:

a spam email; and a phishing email.

15. A computer system for identifying undesirable electronic messages, the computer system comprising:

means for identifying incoming electronic messages;

means for normalizing identified electronic messages according to a plurality of rules for distinguishing non-legitimate words from legitimate words, said normalizing further comprising identifying non-legitimate words obfuscating electronic messages according to the plurality of rules, and deleting the identified non-legitimate words from the electronic messages;

wherein said plurality of rules for distinguishing non-legitimate words from legitimate words comprises at least three rules from a group of rules consisting of:

a rule specifying a maximum number of consecutive vowels in a legitimate word; a rule specifying a maximum number of consecutive consonants in a legitimate word; a rule specifying a maximum number of consecutive uses of any single character in a legitimate word; a rule specifying a maximum number of transitions between upper case letters and lower case letters in a legitimate word; a rule specifying a maximum length of a legitimate word containing numbers without punctuation; a rule specifying a maximum length of a legitimate word containing upper case letters, lower case letters and numbers; a rule specifying a maximum length of a legitimate word containing upper case letters, lower case letters, numbers and punctuation; a rule specifying a minimum number of vowels in a legitimate word; a rule specifying a minimum number of consonants in a legitimate word; a rule specifying a minimum ratio of vowels to consonants in a legitimate word; and a rule specifying a maximum ratio of vowels to consonants in a legitimate word; and means for analyzing normalized electronic message to identify undesirable electronic messages.

16. The computer system of claim 15 further comprising:

means for identifying a language in which an identified electronic message is composed, prior to normalizing the identified electronic message according to the set of rules; and means for normalizing the identified electronic messages according to a set of rules taking into account the identified language.

17. The computer system of claim 15 wherein the means for normalizing identified electronic messages according to a set of rules further comprises:

means for identifying look-alike characters in electronic messages; and means for replacing identified look-alike characters with corresponding primary characters in the electronic messages.

18. The computer system of claim 15 wherein the means for analyzing normalized electronic message to identify undesirable electronic messages further comprises:

means for keeping a count of detected items to be normalized in an electronic message; and means for using data concerning a relationship between the count of detected items and a dynamic threshold value as evidence in the identification of an electronic message as undesirable.

* * * * *

UNITED STATES PATENT AND TRADEMARK OFFICE
CERTIFICATE OF CORRECTION

| | | |
|---|---|---|
| PATENT NO. | : 7,809,795 B1 | Page 1 of 1 |
| APPLICATION NO. | : 11/535437 | |
| DATED | : October 5, 2010 | |
| INVENTOR(S) | : Shaun Cooley and Brian Powell | |

It is certified that error appears in the above-identified patent and that said Letters Patent is hereby corrected as shown below:

In Col. 1, lines 36 and 37, replace

'à Ò ç β G Ø ˙Y Z Θ X Ш' look like 'a O C B G O Y Z O X K W' respectively.

with 'ā Ô Ç ß Ğ Ø ˙Y Z Θ X K Ш' look like 'a O C B G O Y Z O X K W' respectively.

In Col. 3, lines 41, 42, and 43 replace

'à Ò ç β G Ø ˙Y Z Θ X K Ш' look like the characters 'a O C B G O Y Z O X K W' with 'ā Ô Ç ß Ğ Ø ˙Y Z Θ X K Ш' look like the characters 'a O C B G O Y Z O X K W'

In Col. 3, lines 49 and 50 replace

'a̡' with 'a' if the 'a̡' character follows a 't.' with 'ą' with 'a' if the 'ą' character follows a 't.'

Signed and Sealed this

Thirtieth Day of November, 2010

David J. Kappos
*Director of the United States Patent and Trademark Office*